(12) United States Patent
Kelley et al.

(10) Patent No.: US 8,627,944 B2
(45) Date of Patent: Jan. 14, 2014

(54) SYSTEM, APPARATUS, AND METHOD FOR CONVEYING A PLURALITY OF CONTAINERS

(75) Inventors: Paul V. Kelley, Wrightsville, PA (US); David A. Kohler, Perrysburg, OH (US)

(73) Assignee: Graham Packaging Company L.P., York, PA (US)

( * ) Notice: Subject to any disclaimer, the term of this patent is extended or adjusted under 35 U.S.C. 154(b) by 991 days.

(21) Appl. No.: 12/178,186

(22) Filed: Jul. 23, 2008

(65) Prior Publication Data

US 2010/0018838 A1   Jan. 28, 2010

(51) Int. Cl.
- *B65G 17/46* (2006.01)
- *B65G 47/84* (2006.01)
- *B65G 33/02* (2006.01)

(52) U.S. Cl.
CPC .............. *B65G 47/848* (2013.01); *B65G 33/02* (2013.01)
USPC .................................... 198/471.1; 198/459.3

(58) Field of Classification Search
USPC .............. 198/625, 459.1, 459.2, 459.3, 459.4
See application file for complete search history.

(56) References Cited

U.S. PATENT DOCUMENTS

| | | |
|---|---|---|
| 1,499,239 A | 6/1924 | Malmquist |
| D110,624 S | 7/1938 | Mekeel, Jr. |
| 2,124,959 A | 7/1938 | Vogel |
| 2,142,257 A | 1/1939 | Saeta |
| 2,378,324 A | 6/1945 | Ray et al. |
| 2,880,902 A | 4/1959 | Owsen |
| 2,960,248 A | 11/1960 | Kuhlman |
| 2,971,671 A | 2/1961 | Shakman |
| 2,982,440 A | 5/1961 | Harrision |
| 3,004,650 A * | 10/1961 | Pettee ........................... 198/382 |
| 3,043,461 A | 7/1962 | Glassco |
| 3,081,002 A | 3/1963 | Tauschinski et al. |
| 3,090,478 A | 5/1963 | Stanley |
| 3,142,371 A | 7/1964 | Rice et al. |
| 3,174,655 A | 3/1965 | Hurschman |
| 3,198,861 A | 8/1965 | Marvel |

(Continued)

FOREIGN PATENT DOCUMENTS

| | | |
|---|---|---|
| AU | 2002257159 B2 | 4/2003 |
| CA | 2077717 A1 | 3/1993 |

(Continued)

OTHER PUBLICATIONS

International Application No. PCT/US2009/051023—PCT International Search Report and Written Opinion of the International Searching Authority mailed Sep. 8, 2009.

(Continued)

*Primary Examiner* — William R Harp
(74) *Attorney, Agent, or Firm* — Baker Botts L.L.P.

(57) ABSTRACT

A system, apparatus, and method for conveying a plurality of deformable containers. The system can include a conveyor apparatus, an in-feed apparatus, and a rotary apparatus. The in-feed apparatus can be configured to receive the containers from the conveyor apparatus, and may include a first feed screw and a second feed screw. The rotary apparatus can be configured to receive the plurality of filled and sealed containers after the in-feed apparatus. The in-feed apparatus also may be configured to space adjacent filled and sealed containers, with the first and second feed screws acting on the containers to create the spacing. The space created between adjacent containers may be for receipt by said rotary apparatus. The first feed screw may be configured to be positioned substantially directly above the containers, and the second feed screw may be positioned so as to act on the sidewall of the plurality of sealed and filled containers.

24 Claims, 5 Drawing Sheets

(56) References Cited

U.S. PATENT DOCUMENTS

| | | |
|---|---|---|
| 3,201,111 A | 8/1965 | Afton |
| 3,301,293 A | 1/1967 | Santelli |
| 3,325,031 A | 6/1967 | Singier |
| 3,397,724 A | 8/1968 | Bolen et al. |
| 3,409,167 A | 11/1968 | Blanchard |
| 3,417,893 A | 12/1968 | Lieberman |
| 3,426,939 A | 2/1969 | Young |
| 3,441,982 A | 5/1969 | Hiroshi et al. |
| 3,468,443 A | 9/1969 | Marcus |
| 3,483,908 A | 12/1969 | Donovan |
| 3,485,355 A | 12/1969 | Stewart |
| 3,693,828 A | 9/1972 | Kneusel et al. |
| 3,704,140 A | 11/1972 | Petit et al. |
| 3,727,783 A | 4/1973 | Carmichael |
| 3,791,508 A * | 2/1974 | Osborne et al. ............... 198/625 |
| 3,819,789 A | 6/1974 | Parker |
| 3,904,069 A | 9/1975 | Toukmanian |
| 3,918,920 A | 11/1975 | Barber |
| 3,935,955 A | 2/1976 | Das |
| 3,941,237 A | 3/1976 | MacGregor |
| 3,942,673 A | 3/1976 | Lyu et al. |
| 3,949,033 A | 4/1976 | Uhlig |
| 3,956,441 A | 5/1976 | Uhlig |
| 4,035,455 A | 7/1977 | Rosenkranz et al. |
| 4,036,926 A | 7/1977 | Chang |
| 4,037,752 A | 7/1977 | Dulmaine et al. |
| 4,117,062 A | 9/1978 | Uhlig |
| 4,123,217 A | 10/1978 | Fischer et al. |
| 4,125,632 A | 11/1978 | Vosti et al. |
| 4,134,510 A | 1/1979 | Chang |
| 4,158,624 A | 6/1979 | Ford et al. |
| 4,170,622 A | 10/1979 | Uhlig |
| 4,174,782 A | 11/1979 | Obsomer |
| 4,177,239 A | 12/1979 | Gittner et al. |
| 4,219,137 A | 8/1980 | Hutchens |
| 4,231,483 A | 11/1980 | Dechenne et al. |
| 4,247,012 A | 1/1981 | Alberghini |
| 4,301,933 A | 11/1981 | Yoshino et al. |
| 4,318,489 A | 3/1982 | Snyder et al. |
| 4,318,882 A | 3/1982 | Agrawal et al. |
| 4,338,765 A | 7/1982 | Ohmori et al. |
| 4,355,728 A | 10/1982 | Ota et al. |
| 4,377,191 A | 3/1983 | Yamaguchi |
| 4,378,328 A | 3/1983 | Prytulla et al. |
| 4,381,061 A | 4/1983 | Cerny et al. |
| D269,158 S | 5/1983 | Gaunt et al. |
| 4,386,701 A | 6/1983 | Galer |
| 4,436,216 A | 3/1984 | Chang |
| 4,444,308 A | 4/1984 | MacEwen |
| 4,450,878 A | 5/1984 | Takada et al. |
| 4,465,199 A | 8/1984 | Aoki |
| 4,495,974 A * | 1/1985 | Pohorski ....................... 141/132 |
| 4,497,621 A | 2/1985 | Kudert et al. |
| 4,497,855 A | 2/1985 | Agrawal et al. |
| 4,525,401 A | 6/1985 | Pocock et al. |
| 4,542,029 A | 9/1985 | Caner et al. |
| 4,547,333 A | 10/1985 | Takada |
| 4,585,158 A | 4/1986 | Wardlaw, III |
| 4,610,366 A | 9/1986 | Estes et al. |
| 4,628,669 A | 12/1986 | Herron et al. |
| 4,642,968 A | 2/1987 | McHenry et al. |
| 4,645,078 A | 2/1987 | Reyner |
| 4,667,454 A | 5/1987 | McHenry et al. |
| 4,684,025 A | 8/1987 | Copland et al. |
| 4,685,273 A | 8/1987 | Caner et al. |
| D292,378 S | 10/1987 | Brandt et al. |
| 4,701,121 A | 10/1987 | Jakobsen et al. |
| 4,723,661 A | 2/1988 | Hoppmann et al. |
| 4,724,855 A | 2/1988 | Jackson |
| 4,725,464 A | 2/1988 | Collette |
| 4,747,507 A | 5/1988 | Fitzgerald et al. |
| 4,749,092 A | 6/1988 | Sugiura et al. |
| 4,769,206 A | 9/1988 | Reymann et al. |
| 4,773,458 A | 9/1988 | Touzani |
| 4,785,949 A | 11/1988 | Krishnakumar et al. |
| 4,785,950 A | 11/1988 | Miller et al. |
| 4,807,424 A | 2/1989 | Robinson et al. |
| 4,813,556 A | 3/1989 | Lawrence |
| 4,836,398 A | 6/1989 | Leftault et al. |
| 4,840,289 A | 6/1989 | Fait et al. |
| 4,850,493 A | 7/1989 | Howard, Jr. |
| 4,850,494 A | 7/1989 | Howard, Jr. |
| 4,865,206 A | 9/1989 | Behm et al. |
| 4,867,323 A | 9/1989 | Powers |
| 4,880,129 A | 11/1989 | McHenry et al. |
| 4,887,730 A | 12/1989 | Touzani |
| 4,892,205 A | 1/1990 | Powers et al. |
| 4,894,267 A | 1/1990 | Bettle |
| 4,896,205 A | 1/1990 | Weber |
| 4,921,147 A | 5/1990 | Poirier |
| 4,927,679 A | 5/1990 | Beck |
| 4,962,863 A | 10/1990 | Wendling et al. |
| 4,967,538 A | 11/1990 | Leftault et al. |
| 4,978,015 A | 12/1990 | Walker |
| 4,997,692 A | 3/1991 | Yoshino |
| 5,004,109 A | 4/1991 | Bartley et al. |
| 5,005,716 A | 4/1991 | Eberle |
| 5,014,868 A | 5/1991 | Wittig et al. |
| 5,020,691 A | 6/1991 | Nye |
| 5,024,340 A | 6/1991 | Alberghini et al. |
| 5,033,254 A | 7/1991 | Zenger |
| 5,054,632 A | 10/1991 | Alberghini et al. |
| 5,060,453 A | 10/1991 | Alberghini et al. |
| 5,067,622 A | 11/1991 | Garver et al. |
| 5,090,180 A | 2/1992 | Sorensen |
| 5,092,474 A | 3/1992 | Leigner |
| 5,122,327 A | 6/1992 | Spina et al. |
| 5,133,468 A | 7/1992 | Brunson et al. |
| 5,141,121 A | 8/1992 | Brown et al. |
| 5,178,290 A | 1/1993 | Ota et al. |
| 5,199,587 A | 4/1993 | Ota et al. |
| 5,199,588 A | 4/1993 | Hayashi |
| 5,201,438 A | 4/1993 | Norwood |
| 5,217,737 A | 6/1993 | Gygax et al. |
| 5,234,126 A | 8/1993 | Jonas et al. |
| 5,244,106 A | 9/1993 | Takacs |
| 5,251,424 A | 10/1993 | Zenger et al. |
| 5,255,889 A | 10/1993 | Collette et al. |
| 5,261,544 A | 11/1993 | Weaver, Jr. |
| 5,279,433 A | 1/1994 | Krishnakumar et al. |
| 5,281,387 A | 1/1994 | Collette et al. |
| 5,310,043 A | 5/1994 | Alcorn |
| 5,333,761 A | 8/1994 | Davis et al. |
| 5,337,909 A | 8/1994 | Vailliencourt |
| 5,337,924 A | 8/1994 | Dickie |
| 5,341,946 A | 8/1994 | Vailliencourt et al. |
| 5,389,332 A | 2/1995 | Amari et al. |
| 5,392,937 A | 2/1995 | Prevot et al. |
| 5,405,015 A * | 4/1995 | Bhatia et al. .................. 209/524 |
| 5,407,086 A | 4/1995 | Ota et al. |
| 5,411,699 A | 5/1995 | Collette et al. |
| 5,454,481 A | 10/1995 | Hsu |
| 5,472,105 A | 12/1995 | Krishnakumar et al. |
| 5,472,181 A | 12/1995 | Lowell |
| RE35,140 E | 1/1996 | Powers, Jr. |
| 5,484,052 A | 1/1996 | Pawloski et al. |
| D366,831 S | 2/1996 | Semersky et al. |
| 5,492,245 A | 2/1996 | Kalbanis |
| 5,503,283 A | 4/1996 | Semersky |
| 5,543,107 A | 8/1996 | Malik et al. |
| 5,593,063 A | 1/1997 | Claydon et al. |
| 5,598,941 A | 2/1997 | Semersky et al. |
| 5,632,397 A | 5/1997 | Fandeux et al. |
| 5,642,826 A | 7/1997 | Melrose |
| 5,672,730 A | 9/1997 | Cottman |
| 5,687,874 A | 11/1997 | Omori et al. |
| 5,690,244 A | 11/1997 | Darr |
| 5,697,489 A * | 12/1997 | Deonarine et al. ......... 198/464.4 |
| 5,704,504 A | 1/1998 | Bueno |
| 5,713,480 A | 2/1998 | Petre et al. |
| 5,718,030 A * | 2/1998 | Langmack et al. .......... 29/426.3 |
| 5,730,314 A | 3/1998 | Wiemann et al. |
| 5,730,914 A | 3/1998 | Ruppman, Sr. |
| 5,735,420 A | 4/1998 | Nakamaki et al. |

(56) References Cited

U.S. PATENT DOCUMENTS

| | | |
|---|---|---|
| 5,737,827 A | 4/1998 | Kuse et al. |
| 5,758,802 A | 6/1998 | Wallays |
| 5,762,221 A | 6/1998 | Tobias et al. |
| 5,780,130 A | 7/1998 | Hansen et al. |
| 5,785,197 A | 7/1998 | Slat |
| 5,819,507 A | 10/1998 | Kaneko et al. |
| 5,829,614 A | 11/1998 | Collette et al. |
| 5,860,556 A | 1/1999 | Robbins, III |
| 5,887,739 A | 3/1999 | Prevot et al. |
| 5,888,598 A | 3/1999 | Brewster et al. |
| 5,897,090 A | 4/1999 | Smith et al. |
| 5,906,286 A | 5/1999 | Matsuno et al. |
| 5,908,128 A | 6/1999 | Krishnakumar et al. |
| D413,519 S | 9/1999 | Eberle et al. |
| D415,030 S | 10/1999 | Searle et al. |
| 5,971,184 A | 10/1999 | Krishnakumar et al. |
| 5,976,653 A | 11/1999 | Collette et al. |
| 5,989,661 A | 11/1999 | Krishnakumar et al. |
| 6,016,932 A | 1/2000 | Gaydosh et al. |
| RE36,639 E | 4/2000 | Okhai |
| 6,045,001 A | 4/2000 | Seul |
| 6,051,295 A | 4/2000 | Schloss et al. |
| 6,063,325 A | 5/2000 | Nahill et al. |
| 6,065,624 A | 5/2000 | Steinke |
| 6,068,110 A | 5/2000 | Kumakiri et al. |
| 6,074,596 A | 6/2000 | Jacquet |
| 6,077,554 A | 6/2000 | Wiemann et al. |
| 6,090,334 A | 7/2000 | Matsuno et al. |
| 6,105,815 A | 8/2000 | Mazda |
| 6,113,377 A | 9/2000 | Clark |
| D433,946 S | 11/2000 | Rollend et al. |
| 6,176,382 B1 | 1/2001 | Bazlur Rashid |
| D440,877 S | 4/2001 | Lichtman et al. |
| 6,209,710 B1 * | 4/2001 | Mueller et al. ............ 198/470.1 |
| 6,213,325 B1 | 4/2001 | Cheng et al. |
| 6,217,818 B1 | 4/2001 | Collette et al. |
| 6,230,912 B1 | 5/2001 | Rashid |
| 6,248,413 B1 | 6/2001 | Barel et al. |
| 6,253,809 B1 * | 7/2001 | Paradies ...................... 141/372 |
| 6,273,282 B1 | 8/2001 | Ogg et al. |
| 6,290,094 B1 | 9/2001 | Arnold et al. |
| 6,298,638 B1 * | 10/2001 | Bettle ............................ 53/452 |
| D450,595 S | 11/2001 | Ogg et al. |
| 6,354,427 B1 * | 3/2002 | Pickel et al. ............... 198/470.1 |
| 6,390,316 B1 | 5/2002 | Mooney |
| 6,413,466 B1 | 7/2002 | Boyd et al. |
| 6,439,413 B1 | 8/2002 | Prevot et al. |
| 6,460,714 B1 | 10/2002 | Silvers et al. |
| 6,467,639 B2 | 10/2002 | Mooney |
| 6,485,669 B1 | 11/2002 | Boyd et al. |
| 6,494,333 B2 | 12/2002 | Sasaki et al. |
| 6,502,369 B1 | 1/2003 | Andison et al. |
| 6,514,451 B1 | 2/2003 | Boyd et al. |
| 6,585,123 B1 | 7/2003 | Pedmo et al. |
| 6,585,124 B2 | 7/2003 | Boyd et al. |
| 6,595,380 B2 | 7/2003 | Silvers |
| 6,612,451 B2 | 9/2003 | Tobias et al. |
| 6,635,217 B1 | 10/2003 | Britton |
| D482,976 S | 12/2003 | Melrose |
| 6,662,960 B2 | 12/2003 | Hong et al. |
| 6,676,883 B2 | 1/2004 | Hutchinson et al. |
| D492,201 S | 6/2004 | Pritchett et al. |
| 6,749,075 B2 | 6/2004 | Bourque et al. |
| 6,749,780 B2 | 6/2004 | Tobias |
| 6,763,968 B1 | 7/2004 | Boyd et al. |
| 6,763,969 B1 | 7/2004 | Melrose et al. |
| 6,769,561 B2 | 8/2004 | Futral et al. |
| 6,779,673 B2 | 8/2004 | Melrose et al. |
| 6,796,450 B2 | 9/2004 | Prevot et al. |
| 6,920,992 B2 | 7/2005 | Lane et al. |
| 6,923,334 B2 | 8/2005 | Melrose et al. |
| 6,929,138 B2 | 8/2005 | Melrose et al. |
| 6,932,230 B2 | 8/2005 | Pedmo et al. |
| 6,942,116 B2 | 9/2005 | Lisch et al. |
| 6,974,047 B2 | 12/2005 | Kelley et al. |
| 6,983,858 B2 * | 1/2006 | Slat et al. ..................... 215/373 |
| 7,051,073 B1 | 5/2006 | Dutta |
| 7,051,889 B2 | 5/2006 | Boukobza |
| D522,368 S | 6/2006 | Darr et al. |
| 7,073,675 B2 | 7/2006 | Trude |
| 7,077,279 B2 | 7/2006 | Melrose |
| 7,080,747 B2 | 7/2006 | Lane et al. |
| D531,910 S | 11/2006 | Melrose |
| 7,137,520 B1 | 11/2006 | Melrose |
| 7,140,505 B2 | 11/2006 | Roubal et al. |
| 7,150,372 B2 | 12/2006 | Lisch et al. |
| D535,884 S | 1/2007 | Davis et al. |
| 7,159,374 B2 | 1/2007 | Abercrombie, III et al. |
| D538,168 S | 3/2007 | Davis et al. |
| D547,664 S | 7/2007 | Davis et al. |
| 7,334,695 B2 | 2/2008 | Bysick et al. |
| 7,350,657 B2 | 4/2008 | Eaton et al. |
| D572,599 S | 7/2008 | Melrose |
| 7,416,089 B2 | 8/2008 | Kraft et al. |
| D576,041 S | 9/2008 | Melrose et al. |
| 7,451,886 B2 | 11/2008 | Lisch et al. |
| 7,543,713 B2 | 6/2009 | Trude et al. |
| 7,552,834 B2 | 6/2009 | Tanaka et al. |
| 7,574,846 B2 | 8/2009 | Sheets et al. |
| 7,694,842 B2 | 4/2010 | Melrose |
| 7,726,106 B2 | 6/2010 | Kelley et al. |
| 7,735,304 B2 | 6/2010 | Kelley et al. |
| 7,748,551 B2 | 7/2010 | Gatewood et al. |
| D623,952 S | 9/2010 | Yourist et al. |
| 7,799,264 B2 | 9/2010 | Trude |
| 7,882,971 B2 | 2/2011 | Kelley et al. |
| 7,900,425 B2 | 3/2011 | Bysick et al. |
| 7,926,243 B2 | 4/2011 | Kelley et al. |
| D637,495 S | 5/2011 | Gill et al. |
| D637,913 S | 5/2011 | Schlies et al. |
| D641,244 S | 7/2011 | Bysick et al. |
| 7,980,404 B2 | 7/2011 | Trude et al. |
| 8,011,166 B2 | 9/2011 | Sheets et al. |
| 8,017,065 B2 | 9/2011 | Trude et al. |
| D646,966 S | 10/2011 | Gill et al. |
| 8,028,498 B2 | 10/2011 | Melrose |
| 8,075,833 B2 | 12/2011 | Kelley |
| D653,119 S | 1/2012 | Hunter et al. |
| 8,096,098 B2 | 1/2012 | Kelley et al. |
| D653,550 S | 2/2012 | Hunter |
| D653,957 S | 2/2012 | Yourist et al. |
| 8,162,655 B2 | 4/2012 | Trude et al. |
| 8,171,701 B2 | 5/2012 | Kelley et al. |
| 8,235,704 B2 | 8/2012 | Kelley |
| 8,323,555 B2 | 12/2012 | Trude et al. |
| 2001/0035391 A1 | 11/2001 | Young et al. |
| 2002/0063105 A1 | 5/2002 | Darr et al. |
| 2002/0074336 A1 | 6/2002 | Silvers |
| 2002/0096486 A1 | 7/2002 | Lizuka et al. |
| 2002/0153343 A1 | 10/2002 | Tobias et al. |
| 2002/0158038 A1 | 10/2002 | Heisel et al. |
| 2003/0015491 A1 | 1/2003 | Melrose et al. |
| 2003/0186006 A1 | 10/2003 | Schmidt et al. |
| 2003/0196926 A1 | 10/2003 | Tobias et al. |
| 2003/0205550 A1 | 11/2003 | Prevot et al. |
| 2003/0217947 A1 | 11/2003 | Ishikawa et al. |
| 2004/0000533 A1 | 1/2004 | Kamineni et al. |
| 2004/0016716 A1 | 1/2004 | Melrose et al. |
| 2004/0074864 A1 | 4/2004 | Melrose et al. |
| 2004/0129669 A1 | 7/2004 | Kelley et al. |
| 2004/0149677 A1 | 8/2004 | Slat et al. |
| 2004/0173565 A1 | 9/2004 | Semersky et al. |
| 2004/0211746 A1 | 10/2004 | Trude |
| 2004/0232103 A1 | 11/2004 | Lisch et al. |
| 2005/0035083 A1 | 2/2005 | Pedmo et al. |
| 2005/0211662 A1 | 9/2005 | Eaton et al. |
| 2005/0218108 A1 | 10/2005 | Bangi et al. |
| 2006/0006133 A1 | 1/2006 | Lisch et al. |
| 2006/0051541 A1 | 3/2006 | Steele |
| 2006/0138074 A1 | 6/2006 | Melrose |
| 2006/0151425 A1 | 7/2006 | Kelley et al. |
| 2006/0231985 A1 | 10/2006 | Kelley |
| 2006/0243698 A1 | 11/2006 | Melrose |
| 2006/0255005 A1 | 11/2006 | Melrose et al. |

(56) References Cited

U.S. PATENT DOCUMENTS

| | | |
|---|---|---|
| 2006/0261031 A1 | 11/2006 | Melrose |
| 2007/0017892 A1 | 1/2007 | Melrose |
| 2007/0045222 A1 | 3/2007 | Denner et al. |
| 2007/0045312 A1 | 3/2007 | Abercrombie, III et al. |
| 2007/0051073 A1 | 3/2007 | Kelley et al. |
| 2007/0084821 A1 | 4/2007 | Bysick et al. |
| 2007/0125742 A1 | 6/2007 | Simpson, Jr. et al. |
| 2007/0125743 A1 | 6/2007 | Pritchett, Jr. et al. |
| 2007/0131644 A1 | 6/2007 | Melrose |
| 2007/0181403 A1 | 8/2007 | Sheets et al. |
| 2007/0199915 A1 | 8/2007 | Denner et al. |
| 2007/0199916 A1 | 8/2007 | Denner et al. |
| 2007/0215571 A1 | 9/2007 | Trude |
| 2007/0235905 A1 | 10/2007 | Trude et al. |
| 2008/0047964 A1 | 2/2008 | Denner et al. |
| 2008/0156847 A1 | 7/2008 | Hawk et al. |
| 2008/0257856 A1 | 10/2008 | Melrose et al. |
| 2009/0090728 A1 | 4/2009 | Trude et al. |
| 2009/0091067 A1 | 4/2009 | Trude et al. |
| 2009/0092720 A1 | 4/2009 | Trude et al. |
| 2009/0120530 A1 | 5/2009 | Kelley et al. |
| 2009/0134117 A1 | 5/2009 | Mooney |
| 2009/0202766 A1 | 8/2009 | Beuerle et al. |
| 2009/0293436 A1 | 12/2009 | Miyazaki et al. |
| 2010/0116778 A1 | 5/2010 | Melrose |
| 2010/0133228 A1 | 6/2010 | Trude |
| 2010/0163513 A1 | 7/2010 | Pedmo |
| 2010/0170199 A1 | 7/2010 | Kelley et al. |
| 2010/0213204 A1 | 8/2010 | Melrose |
| 2010/0237083 A1 | 9/2010 | Trude et al. |
| 2010/0301058 A1 | 12/2010 | Trude et al. |
| 2011/0049083 A1 | 3/2011 | Scott et al. |
| 2011/0049084 A1 | 3/2011 | Yourist et al. |
| 2011/0084046 A1 | 4/2011 | Schlies et al. |
| 2011/0094618 A1 | 4/2011 | Melrose |
| 2011/0108515 A1 | 5/2011 | Gill et al. |
| 2011/0113731 A1 | 5/2011 | Bysick et al. |
| 2011/0132865 A1 | 6/2011 | Hunter et al. |
| 2011/0147392 A1 | 6/2011 | Trude et al. |
| 2011/0210133 A1 | 9/2011 | Melrose et al. |
| 2011/0266293 A1 | 11/2011 | Kelley et al. |
| 2011/0284493 A1 | 11/2011 | Yourist et al. |
| 2012/0104010 A1 | 5/2012 | Kelley |
| 2012/0107541 A1 | 5/2012 | Nahill et al. |
| 2012/0132611 A1 | 5/2012 | Trude et al. |
| 2012/0152964 A1 | 6/2012 | Kelley et al. |
| 2012/0240515 A1 | 9/2012 | Kelley et al. |
| 2012/0266565 A1 | 10/2012 | Trude et al. |
| 2012/0267381 A1 | 10/2012 | Trude et al. |
| 2013/0000259 A1 | 1/2013 | Trude et al. |

FOREIGN PATENT DOCUMENTS

| | | |
|---|---|---|
| DE | 1761753 | 1/1972 |
| DE | P2102319.8 | 8/1972 |
| DE | 3215866 A1 | 11/1983 |
| EP | 0 225 155 A2 | 6/1987 |
| EP | 225 155 A2 | 6/1987 |
| EP | 0 346 518 A1 | 12/1989 |
| EP | 0 502 391 A2 | 9/1992 |
| EP | 0 505054 A1 | 9/1992 |
| EP | 0 521 642 A1 | 1/1993 |
| EP | 0 551 788 A1 | 7/1993 |
| EP | 0666222 A1 | 2/1994 |
| EP | 0 739 703 | 10/1996 |
| EP | 0 609 348 B1 | 2/1997 |
| EP | 0 916 406 A2 | 5/1999 |
| EP | 0957030 A2 | 11/1999 |
| EP | 1 063 076 A1 | 12/2000 |
| FR | 1571499 | 6/1969 |
| FR | 2607109 | 5/1988 |
| GB | 781103 | 8/1957 |
| GB | 1113988 | 5/1968 |
| GB | 2050919 A | 1/1981 |
| GB | 2372977 A | 9/2002 |
| JP | S40-15909 | 6/1940 |
| JP | 48-31050 | 9/1973 |
| JP | 49-028628 | 7/1974 |
| JP | 54-72181 A | 6/1979 |
| JP | S54-70185 | 6/1979 |
| JP | 35656830 A | 5/1981 |
| JP | S56-62911 | 5/1981 |
| JP | 56-72730 U | 6/1981 |
| JP | S57-17730 | 1/1982 |
| JP | 57-37827 | 2/1982 |
| JP | 57-126310 | 8/1982 |
| JP | 57-210829 A | 12/1982 |
| JP | 58-055005 | 4/1983 |
| JP | 61-192539 A | 8/1986 |
| JP | 63-189224 A | 8/1988 |
| JP | 64-004662 | 2/1989 |
| JP | 03-43342 A | 2/1991 |
| JP | 03-076625 A | 4/1991 |
| JP | 4-10012 | 1/1992 |
| JP | 05-193694 A | 8/1993 |
| JP | 53-10239 A | 11/1993 |
| JP | H05-81009 | 11/1993 |
| JP | 06-270235 A | 9/1994 |
| JP | 6-336238 A | 12/1994 |
| JP | 07-300121 A | 11/1995 |
| JP | H08-048322 | 2/1996 |
| JP | 08-244747 A | 9/1996 |
| JP | 8-253220 A | 10/1996 |
| JP | 8-282633 A | 10/1996 |
| JP | 09-039934 A | 2/1997 |
| JP | 9-110045 A | 4/1997 |
| JP | 10-167226 A | 6/1998 |
| JP | 10-181734 A | 7/1998 |
| JP | 10-230919 A | 9/1998 |
| JP | 3056271 | 11/1998 |
| JP | 11-218537 A | 8/1999 |
| JP | 2000-229615 | 8/2000 |
| JP | 2002-127237 A | 5/2002 |
| JP | 2002-160717 A | 6/2002 |
| JP | 2002-326618 A | 11/2002 |
| JP | 2003-095238 | 4/2003 |
| JP | 2004-026307 A | 1/2004 |
| JP | 2006-501109 T | 1/2006 |
| JP | 2007-216981 A | 8/2007 |
| JP | 2008-189721 A | 8/2008 |
| JP | 2009-001639 A | 1/2009 |
| NZ | 240448 | 6/1995 |
| NZ | 296014 | 10/1998 |
| NZ | 335565 | 10/1999 |
| NZ | 506684 | 9/2001 |
| NZ | 512423 | 9/2001 |
| NZ | 521694 | 10/2003 |
| WO | WO 93/09031 A1 | 5/1993 |
| WO | WO 93/12975 A1 | 7/1993 |
| WO | WO 94/05555 | 3/1994 |
| WO | WO 94/06617 | 3/1994 |
| WO | WO 97/03885 | 2/1997 |
| WO | WO 97/14617 | 4/1997 |
| WO | WO 97/34808 A1 | 9/1997 |
| WO | WO 99/21770 | 5/1999 |
| WO | WO 00/38902 A1 | 7/2000 |
| WO | WO 00/51895 A1 | 9/2000 |
| WO | WO 01/12531 A1 | 2/2001 |
| WO | WO 01/40081 A1 | 6/2001 |
| WO | WO 01/74689 A1 | 10/2001 |
| WO | WO 02/02418 A1 | 1/2002 |
| WO | WO 02/18213 A1 | 3/2002 |
| WO | WO 02/085755 A1 | 10/2002 |
| WO | WO 2004/028910 A1 | 4/2004 |
| WO | WO 2004/106176 A2 | 9/2004 |
| WO | WO 2004/106175 A1 | 12/2004 |
| WO | WO 2005/012091 A2 | 2/2005 |
| WO | WO 2005/025999 A1 | 3/2005 |
| WO | WO 2005/087628 A1 | 9/2005 |
| WO | WO 2006/113428 A3 | 10/2006 |
| WO | WO 2007/047574 A1 | 4/2007 |

(56) References Cited

FOREIGN PATENT DOCUMENTS

WO     WO 2007/127337 A2     11/2007
WO     WO 2010/058098 A2     5/2010

OTHER PUBLICATIONS

Chanda, M. & Roy, Salil K., Plastics Technology Handbook, 2007, CRC Press, pp. 2-34-2-37.
ISR and Written Opinion for PCT/US2010/020045 dated Mar. 15, 2010.
"Application and Development of PET Plastic Bottle," Publication of Tsinghad Tongfang Optical Disc Co. Ltd., Issue 4, 2000, p. 41. (No English language translation available).
U.S. Appl. No. 60/220,326, filed Jul. 24, 2000.
International Search Report for PCT/US2005/008374 dated Aug. 2, 2005.
IPRP (including Written Opinion) for PCT/US2005/008374 dated Sep. 13, 2006.
Final Office Action for U.S. Appl. No. 10/558,284 dated Sep. 9, 2008.
Office Action for U.S. Appl. No. 10/558,284 dated Jan. 25, 2008.
Office Action for U.S. Appl. No. 10/566,294 dated Oct. 27, 2008.
Final Office Action for U.S. Appl. No. 10/566,294 dated Feb. 13, 2009.
Office Action for U.S. Appl. No. 10/851,083 dated Nov. 11, 2008.
Final Office Action for U.S. Appl. No. 10/851,083 dated Jun. 12, 2008.
Office Action for U.S. Appl. No. 10/851,083 dated Sep. 6, 2007.
International Search Report for PCT/US2004/024581 dated Jul. 25, 2005.
IPRP (including Written Opinion) for PCT/US2004/024581 dated Jan. 30, 2006.
International Search Report for PCT/US2004/016405 dated Feb. 15, 2005.
IPRP (including Written Opinion) for PCT/US2004/016405 dated Nov. 25, 2005.
Office Action for Application No. EP 06 750 165.0-2307 dated Nov. 24, 2008.
International Search Report for PCT/US2006/040361 dated Feb. 26, 2007.
IPRP (including Written Opinion) for PCT/US2006/040361 dated Apr. 16, 2008.
International Search Report for PCT/US2007/006318 dated Sep. 11, 2007.
IPRP (including Written Opinion) PCT/US2007/006318 dated Sep. 16, 2008.
IPRP (including Written Opinion) PCT/US2006/014055 dated Oct. 16, 2007.
Office Action for Application No. 12/349,268 dated Aug. 12, 2010.
Notice of Allowance for U.S. Appl. No. 12/349,268 dated Dec. 16, 2010.
Office Action for U.S. Appl. No. 12/651,461 dated May 3, 2011.
Official Notification for counterpart Japanese Application No. 2006-522084 dated May 19, 2009.
Examination Report for counterpart New Zealand Application No. 545528 dated Jul. 1, 2008.
Examination Report for counterpart New Zealand Application No. 569422 dated Jul. 1, 2008.
Examination Report for New Zealand Application No. 550336 dated Mar. 26, 2009.
Examination Report for counterpart New Zealand Application No. 545528 dated Sep. 20, 2007.
Examination Report for counterpart New Zealand Application No. 569422 dated Sep. 29, 2009.
Office Action for Chinese Application No. 2006800380748 dated Jul. 10, 2009.
Examiner's Report for Australian Application No. 2006236674 dated Sep. 18, 2009.
Examiner's Report for Australian Application No. 2006236674 dated Nov. 6, 2009.
Office Action for Chinese Application No. 200680012360.7 dated Jul. 10, 2009.
Examination Report for New Zealand Application No. 563134 dated Aug. 3, 2009.
Office Action for European Application No. 07752979.0-2307 dated Aug. 21, 2009.
International Search Report for PCT/US2006/014055 dated Dec. 7, 2006.
Office Action dated Feb. 3, 2010 for Canadian Application No. 2,604,231.
Communication dated Mar. 9, 2010 for European Application No. 09 173 607.4 enclosing European search report and European search opinion dated Feb. 25, 2010.
European Search Report for EPA 10185697.9 dated Mar. 21, 2011.
International Search report dated Apr. 21, 2010 from corresponding PCT/US2009/066191 filed Dec. 1, 2009.
International Preliminary Report on Patentability and Written Opinion dated Jun. 14, 2011 for PCT/US2009/066191. 7 pages.
Office Action, Japanese Application No. 2008-506738 dated Aug. 23, 2011.
Extended European Search Report for EPA 10185697.9 dated Jul. 6, 2011.
Patent Abstracts of Japan, vol. 012, No. 464; Dec. 6, 1988.
Patent Abstracts of Japan, vol. 2002, No. 09, Sep. 4, 2002.
Patent Abstracts of Japan, vol. 015, No. 239, Jun. 20, 1991.
Examination Report dated Jul. 25, 2012, in New Zealand Patent Application No. 593486.
Taiwanese Office Action dated Jun. 10, 2012, Application No. 095113450.
Japanese First Notice of Reasons for Rejection dated Aug. 23, 2011, in Application No. 2008-506738.
Japanese Second Notice of Reasons for Rejection dated Jun. 11, 2012, in Application No. 2008-506738.
Office Action dated Aug. 14, 2012, in Japanese Patent Application No. 2008-535769.
Examiner's Report dated Feb. 15, 2011 in Australian Application No. AU200630483.
Office Action dated Oct. 31, 2011, in Australian Patent Application No. 2011203263.
Office Action dated Jul. 19, 2011, in Japanese Patent Application No. 2008-535769.
Office Action dated Dec. 6, 2011, in Japanese Patent Application No. 2008-535769.
International Search Report and Written Opinion for PCT/US2012/050251 dated Nov. 16, 2012.
International Search Report and Written Opinion for PCT/US2012/050256 dated Dec. 6, 2012.
Requisition dated Feb. 3, 2010 for Canadian Application No. 2,604,231.
Requisition dated Jan. 9, 2013 for Canadian Application No. 2,559,319.
Office Action dated Feb. 5, 2013, in Mexican Patent Application No. MX/a/2008/004703.
Office Action dated Jul. 26, 2010 for Canadian Application No. 2,527,001.
Australian Office Action dated Mar. 3, 2011 in Application No. 2010246525.
Australian Office Action dated Nov. 8, 2011, in Application No. 2011205106.
Examiner Report dated May 26, 2010, in Australian Application No. 2004261654.
Examiner Report dated Jul. 23, 2010, in Australian Application No. 2004261654.
Requisition dated May 25, 2010 for Canadian Application No. 2,534,266.
Communication dated Jun. 16, 2006, for European Application No. 04779595.0.
Final Official Notification dated Mar. 23, 2010 for Japanese Application No. 2006-522084.
International Search Report and Written Opinion dated Dec. 18, 2012, in PCT/US12/056330.

* cited by examiner

SYSTEM, APPARATUS, AND METHOD FOR CONVEYING A PLURALITY OF CONTAINERS

NAMES OF PARTIES TO JOINT RESEARCH AGREEMENT

The invention herein was made under a joint research agreement involving Palmer Associates Inc. and Owens Brockway Plastic Products Inc. (predecessor to Graham Packaging Company, L.P.).

The present invention relates to a system, an apparatus, and a method for conveying a plurality of containers. In particular, the system, apparatus, and method according to various embodiments of the present invention can be directed to conveying, for rotary equipment, a plurality of deformable containers.

BRIEF SUMMARY OF THE INVENTION

As used herein, the phrase "various embodiments" is intended to mean an embodiment, at least one embodiment, some embodiments, and/or all embodiments without limitation.

Various embodiments of the present invention can include (i.e., comprise) an apparatus having first conveying means for conveying a plurality of containers in a first direction, second conveying means for conveying the plurality of containers in the first direction, and third conveying means for conveying the plurality of containers in the first direction. The first conveying means for conveying can be configured to move so as to act against a first portion of the plurality of containers to convey the plurality of containers in the first direction. The second conveying means for conveying can be configured to move so as to act against a second portion of the plurality of containers to convey the plurality of containers in the first direction. The third conveying means for conveying can be configured to convey the plurality of containers in the first direction by a third portion of the plurality of containers. The first, second, and third conveying means can be configured to convey the plurality of containers at the same time. The first, second, and third portions of the plurality of containers may be different from each of the other portions, and the first portion can be at a position on the container higher than the second portion.

Various embodiments can also include a system for conveying a plurality of filled and sealed containers, where each of the filled and sealed containers can include a sidewall having a substantially deformable portion. The system can comprise a conveyor apparatus to convey the plurality of filled and sealed containers, an in-feed apparatus which can receive the filled and sealed containers from the conveyor apparatus, and a rotary apparatus that can receive the plurality of filled and sealed containers after the in-feed apparatus. The in-feed apparatus can include a first feed screw and a second feed screw. Further, the in-feed apparatus can be configured to create space between adjacent ones of the filled and sealed containers, where the first feed screw and the second feed screw can act on the plurality of sealed and filled containers to create the respective spaces. The space created between adjacent ones of the filled and sealed containers may be for receipt by the rotary apparatus. The first feed screw may be configured so that it can be positioned substantially directly above the plurality of sealed and filled containers, and the second feed screw may be positioned so as to act on the sidewall of the plurality of sealed and filled containers.

Various embodiments also include a method for conveying a plurality of filled and sealed plastic containers, where each of the filled and sealed plastic containers can include a deformable side portion and a bottom portion which may have a standing portion and a vacuum panel. The method can comprise conveying the plurality of filled and sealed plastic containers single file, where each of the filled and sealed plastic containers may have respective side portions that are deformed and vacuum panels that are un-activated and arranged so as not to extend below the standing portion; creating a substantially uniform distance between adjacent ones of the filled and sealed plastic containers which may have respective deformed side portions and vacuum panels that are un-activated and arranged so as not to extend below the standing surface; and after the creating a substantially uniform distance, sequentially feeding the plurality of filled and sealed plastic containers. The creating of a substantially uniform distance may be based on said sequentially feeding and can include providing two positive control points for each of the filled and sealed plastic containers. One of the positive control points may be at a top portion of the filled and sealed plastic container, and the other of the positive control points may be at the bottom portion of the filled and sealed plastic container.

BRIEF DESCRIPTION OF THE DRAWINGS

The accompanying drawings, which are incorporated in and constitute a part of this specification, illustrate embodiments of the invention. The invention will be best understood by reading the ensuing specification in conjunction with the drawing figures, in which like elements are designated by like reference numerals, and wherein.

DETAILED DESCRIPTION

Figure 1:
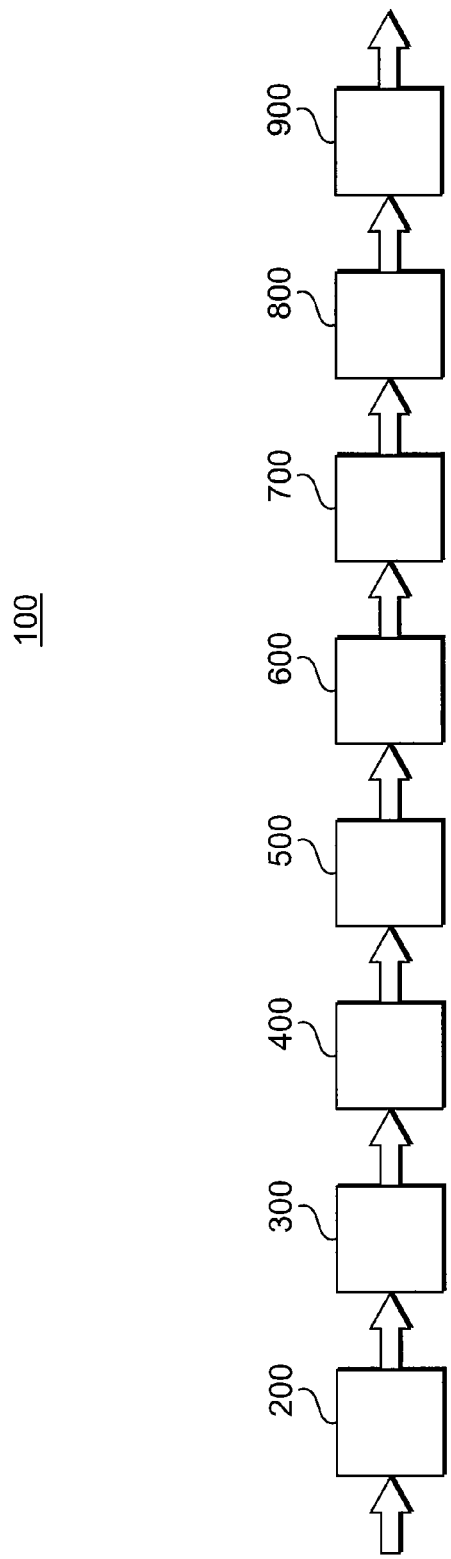
FIG. 1 is a block diagram representation of a system according to various embodiments of the present invention.

Various embodiments of the present invention are directed generally to a system, an apparatus, and a method for conveying a plurality of containers, wherein the containers may have at least one portion that is deformable, flimsy, and/or pliable. For example, embodiments of the present invention can include a twin screw feeding apparatus to separate and feed containers for a rotary apparatus prior to manipulating a base portion to make the deformable, flimsy, and/or pliable portion into a desired configuration and/or constitution, such as, but not limited to, substantially smooth, sturdier, rounded, etc.

Containers for conveying by the system, apparatus, and method according to various embodiments of the present invention can be filled with any suitable product, including, but not limited to, carbonated beverages, non-carbonated beverages, water, tea, sports drinks, dry products, etc. The product can be filled into the container at any suitable temperature, including, but not limited to, a hot-fill, a warm-fill, a room temperature-fill, a cold fill, etc. The product can be hot-filled into the container at any suitable temperature. For example, the temperature of a hot product filled in container can be at a temperature of about 185 degrees Fahrenheit.

Containers to be conveyed by the system, apparatus, and method according to various embodiments of the present invention can be formed in any suitable manner, such as, but not limited to, blow molding. Additionally, containers to be conveyed by the system, apparatus, and method according to various embodiments of the present invention can be of any suitable size, of any suitable material, and the containers can be either sealed or unsealed. For example, the containers can have any suitable internal volume, such as, but not limited to, an internal volume of 16 oz., or an internal volume to accommodate being filled with 16 oz. of a product. The containers also can have any suitable height, such as, but not limited to, a height from about five inches to about eleven inches, and any suitable diameter, such as a diameter from about 1.75 inches to about 4.25 inches, for example. Regarding material, the containers can be made of any suitable material. In various embodiments, the containers can be made of any suitable pliable material, such as, but not limited to, plastic, rubber, etc., or combination thereof.

Additionally, containers for conveying by the system, apparatus, and method according to various embodiments of the present invention can be of any suitable configuration or shape. For example, the containers can have at least one portion that is deformable, flimsy, and/or pliable. In various embodiments, the containers can have at least a sidewall portion and/or a base portion that is/are deformable, flimsy, and/or pliable. For example, a vacuum panel can be provided in a bottom end portion of the base portion of each of the containers. A deformable sidewall portion can include a vacuum panel or panels and/or any other portion that is or can be caused to deform. In addition, in various embodiments, containers for conveying by the system, apparatus, and method according to various embodiments of the present invention may not be configured or formed with a deformable, flimsy, and/or pliable portion or portions, such as a vacuum panel, at a bottom end portion thereof.

Note, that containers for conveying by the system, apparatus, and method according to various embodiments of the present invention also may be blow molded and formed originally in an organic, ambiguous shape, such that a central portion, located at a bottom end thereof, for example, is freeform and substantially asymmetrical. Additionally, containers formed or configured with the deformable, flimsy, and/or pliable portion, such as a vacuum panel, formed in a bottom end portion thereof can be conveyed with the deformable, flimsy, and/or pliable portion at the bottom end thereof in any suitable position, arrangement, or status. For example, containers having a vacuum panel at the bottom end can be conveyed with the vacuum panel either activated or un-activated.

Figure 5:
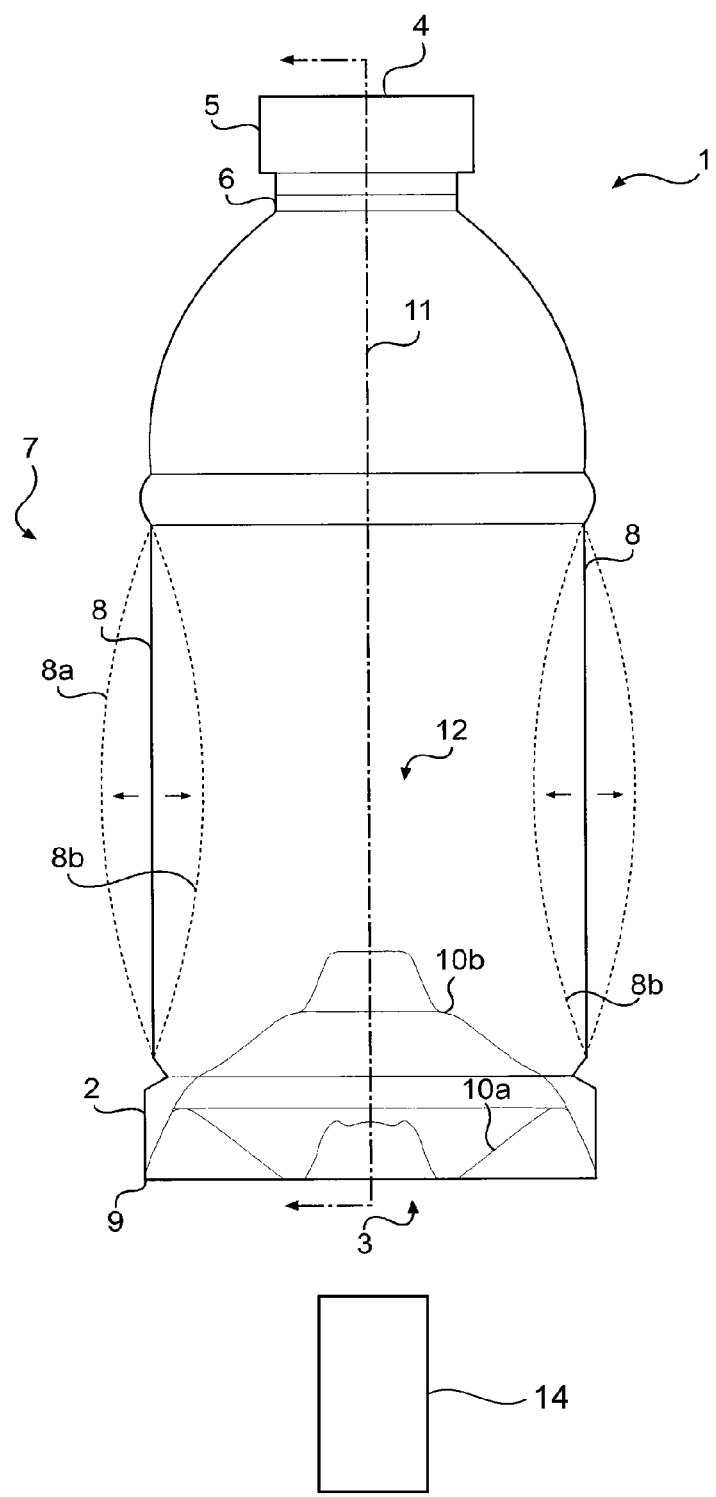
FIG. 5 is a side view representation of an exemplary container that can be used by the system, apparatus, and method according to various embodiments of the present invention.

Turning to FIG. 5, this figure shows a side view representation of an exemplary container 1 that can be used with the system, apparatus, and method according to various embodiments of the present invention. The container 1 shown in FIG. 5 can include a base portion 2, a sidewall 7, and a neck portion 6, where the base portion 2 forms a closed end of the container and is coupled to sidewall 7, which is coupled to neck portion 6, thereby forming an opening 4 and an internal volume 12.

In various embodiments, container 1 can be sealed by a cap or lid 5 after being filled with a product (not shown). The container can be sealed by any suitable means. For example, cap or lid 5 can be sealed to neck portion 6 by threads, snap fit, etc.

Sidewall 7 can be of any suitable configuration and/or shape. In various embodiments, sidewall 7 can include a sidewall portion 8 that is deformable, flimsy, and/or pliable. As such, the containers may not have a fixed dimension in the sidewall portion 8. Sidewall portion 8 can be any suitable deformable portion, such as a vacuum panel, a portion that is not a vacuum panel, or combination thereof. In various embodiment, sidewall portion 8 may be substantially more deformable, flimsy, and/or pliable than base portion 2 and/or neck portion 6, for example. Sidewall portion 8 can move or can be deformed in any suitable manner, in any suitable direction, for any suitable purpose, and/or to take any suitable shape. For example, sidewall portion 8 can move outward, as shown by 8*a*, inward, as shown by 8*b*, or a combination thereof.

Sidewall portion 8 can be deformed or caused to move by any suitable means. Additionally, deformable sidewall portion 8 may not be permanently deformed. For example, deformable sidewall portion 8 can be deformed or moved to a first position (e.g., 8*b*), and, afterward, can be moved to a second position (e.g., back to 8). In various embodiments, sidewall portion 8 can be deformed or moved in response to internal forces created inside the container after the container has been either filled with a product or filled with a product and sealed. For example, internal forces of the container can be created by the following: heating a product inside container 1 after being filled and sealed, by hot-filling a product and sealing the container 1, or by hot-filling, sealing, and subsequently cooling of a product. For hot-filling and sealing, the sidewall portion may be deformed outward, such as shown by the dashed lines 8*a*. For hot-filling, sealing, and subsequently cooling, a vacuum can be created in the container 1, thereby deforming sidewall portion inward, such as shown by the dashed lines 8*b*.

Base portion 2 can be coupled to sidewall 7, and can be of any suitable shape and configuration. In various embodiments, base portion 7 can be formed to include an end portion 3 and a support surface 9, such as, but not limited to, a standing ring. The standing ring can be continuous or non-continuous. In various embodiments, base portion 7 can include a vacuum panel 10 created at end portion 3.

Vacuum panel 10 can be of any suitable configuration. In various embodiments, vacuum panel 10 can be coupled to support surface 9, and can be formed so that the vacuum panel 10 either does not extend below a horizontal plane of the support surface 9 for supporting the container 1 or does not extend to a horizontal plane of the support surface 9, at least when it is to be conveyed or undergoes various ones of the operations of the system, apparatus, and method according to various embodiments of the present invention. In various embodiments, the vacuum panel 10 may have been blow molded or positioned below support surface 9, however, as noted above, when the containers undergo various operations of the system, apparatus, and method according to various embodiments, the vacuum panels 10 may not extend below the horizontal plane of the support surface 9, or may not extend to the horizontal plane of the support surface 9.

The support surface 9 of the container 1 can be of any suitable configuration and can be used to assist in conveying the container 1 by providing a horizontal support surface on which the container can be supported and/or conveyed. Moreover, if the vacuum panel 10 has a portion that extends to the horizontal plane of the support surface 9, that portion of vacuum panel 10 may also assist in supporting and/or conveying (i.e., supporting) the container 1.

The vacuum panel 10, or any suitable portion thereof, may be moveable. In various embodiments, the vacuum panel 10 may be moveable from a first position 10a to a second position 10b, by any suitable means 14 (shown diagrammatically), after the container has been filled and sealed, to thereby activate the vacuum panel 10. Activating the vacuum panel 10 may either reduce a vacuum created in the filled and sealed container, negate the vacuum created in the filled and sealed container, or create an overpressure in the container. The means 14 for moving the vacuum panel 10 from the first position 10a to the second position 10b can be a rod that acts on a portion of the vacuum panel 10 and/or can be formed to take the shape of at least a portion of the vacuum panel 10 to force the vacuum panel 10 from a first position 10a to a second position 10b, for example.

A system and an apparatus according various embodiments of the invention will now be described with respect to FIGS. 1-3.

Generally, in various embodiments of the present invention a conveyor apparatus can feed the containers to two feed screws (e.g., worms) of an in-feed apparatus. The feed screws can space the containers to a desired or correct spacing for a rotary apparatus to carry and feed the containers to another rotary apparatus. Once the containers are on the another rotary apparatus, an actuator associated with each container can act to activate or move the vacuum panel 10 of the container 1. After the vacuum panel has been moved or activated, the container can then be transferred from the other rotary apparatus to yet another rotary apparatus and on to other apparatuses and/or operations.

FIG. 1 is a block diagram representation of a system 100 according to various embodiments of the present invention. More specifically, FIG. 1 shows a block diagram representation of a system 100 for conveying a plurality of containers. In FIG. 1, the boxes labeled 200-900 may represent apparatuses configured to perform respective operation(s) on the plurality of containers, and the arrows connecting adjacent apparatuses represent a general "flow" that the plurality of containers may undergo. Note that although the flow of the containers in FIG. 1 is shown as being generally linear, FIG. 1 also is intended to represent that the containers can undergo operations at one or more of the apparatuses at the same time.

Apparatuses 200-900 can be any suitable apparatuses for performing desired operations on the containers. For example, apparatus 200 can be any suitable apparatus configured to perform an operation or operations on the containers; apparatus 300 can be a conveyor apparatus; apparatus 400 can be an in-feed apparatus; apparatuses 500-700 can be various rotary apparatuses; apparatus 800 can be a conveyor apparatus; and apparatus 900 can be any suitable apparatus, such as, but not limited to, a container inspection apparatus, configured to receive from, or perform operation(s) on, the containers after or while the containers are subjected to the conveyor apparatus 800.

As noted above, apparatus 200 can be any suitable apparatus configured to perform an operation or operations on the containers. In various embodiments, the operation may be transferring or conveying the containers to conveyor apparatus 300. Apparatus 200 can be configured as any suitable means for transferring or conveying the containers to conveyor apparatus 300. For example, apparatus 200 may be configured as a rail to transport or convey the containers by a neck portion to conveyor apparatus 300, or apparatus 200 may be configured as a robotic arm to transfer or convey the containers to conveyor apparatus 300. In various embodiments, apparatus 200 can transfer or convey the containers after the containers have been filled with a product; after the containers have been filled with a product and sealed; after the containers have been filled, sealed, and cooled; or after the containers have been hot-filled, sealed, and cooled. The cooling of a product in the filled and sealed container may be performed by any suitable means, such as, but not limited to, a cooler, sprinklers, misters, etc.

Filling the containers with a product at an elevated temperature (e.g., hot-filling) and subsequently sealing the containers may create internal forces within the filled and sealed container. Internal forces created by filling the container with a product at an elevated temperature may cause at least portion of the container to become deformed with respect to a previous state (e.g., a blow molded state or a state immediately prior to being filled). In various embodiments, the portion of the container that may be deformed can be a sidewall portion 8, and the sidewall portion 8 may be deformed substantially outward, away from a central longitudinal axis of the container.

Likewise, cooling a product in the filled and sealed container, such as a product a hot-filled product, also may create internal forces within the filled and sealed container. In various embodiments, cooling a product in the filled and sealed containers, such as a hot-filled product, may create a vacuum in the container. The vacuum may cause at least portion of the container to become deformed with respect to a previous state (e.g., a blow molded state, a state immediately prior to being filled, or a state after being filled and sealed). In various embodiments, the portion of the container that can be deformed may be sidewall portion 8, and the sidewall portion 8 may be deformed substantially inward, toward a central longitudinal axis 12 of the container 1.

Conveyor apparatus 300 can be any suitable apparatus to convey a plurality of containers in any suitable configuration (e.g., arrangement), of any suitable shape, and of any suitable size. For example, conveyor apparatus 300 may be a conveyor belt, an air conveyor system, etc. In various embodiments, conveyor apparatus 300 can convey the containers single file. Moreover, conveyor apparatus 300 can convey the containers either while the containers are in contact with adjacent containers (i.e., no space between adjacent containers) or while the containers are at a distance or spaced from adjacent containers. Though FIG. 2 shows the containers on conveyor apparatus 300 touching, $S_1$ may represent either of the foregoing situations (i.e., no space between adjacent containers or space between the containers). Furthermore, conveyor apparatus 300 can be controlled by any suitable means, such as, but not limited to, a motor, and can convey the containers at any suitable speed, including, but not limited to, at about eleven hundred containers per minute.

In various embodiments, conveyor apparatus 300 can be configured to receive containers from apparatus 200, substantially as described above. FIGS. 2 and 3, for example, show that conveyor apparatus 300 may be a conveyor belt that conveys the containers to in-feed apparatus 400. As can be seen from FIG. 2, conveyor apparatus 300 can convey the containers 1 in a first direction (indicated by the right-going arrow) toward in-feed apparatus 400. In various embodiments, and as can be seen from FIGS. 2 and 3, conveyor apparatus 300 can work in conjunction with the in-feed apparatus 400. Thus, as is apparent, conveyor apparatus 300 can convey the same containers as the in-feed apparatus 400, at the same time, as does the in-feed apparatus 400. Though not shown, in various alternative embodiments, conveyor apparatus 300 may not convey the same container or containers at the same time as does the in-feed apparatus 400, and, instead, may only feed the containers to in-feed apparatus 400.

As noted above, conveyor apparatus 300 can convey the containers in single file to in-feed apparatus 400. Furthermore, conveyor apparatus 300 may convey the containers in single file, with the containers either touching adjacent containers, or with adjacent containers being at a first distance $S_1$ from each other. In various embodiments, the first distance $S_1$ can be substantially uniform. Conveyor apparatus 300 also may convey the containers with the containers being at unequal distances from adjacent containers. Note that the indicia $S_1$ shown in FIG. 2 may represent touching containers, a substantially uniform distance, or unequal distances. Moreover, the distance represented by $S_1$ can be any suitable distance, and may be based on an outer diameter of the containers or a central longitudinal axis of the containers, for example.

Conveyor apparatus 300 can convey the containers by a standing or support surface 9 of the container 1. As can be seen in FIG. 3, conveyor apparatus 300 can be positioned below the containers, so that the standing or support surfaces 9 of the containers can rest on conveyor apparatus 300. In various embodiments, only a portion of the standing or support surfaces of the container rests on a portion of the conveyor apparatus 300. Additionally, containers to be conveyed by conveyor apparatus 300, according to various embodiments of the invention, each may be configured with a vacuum panel at a base portion, such as at a bottom end portion of the base portion of the container. When the containers having respective vacuum panels at the bottom end portion are conveyed by conveyor apparatus 300, the vacuum panels may be arranged such that no portion extends below the standing or support surfaces. The vacuum panels also can be arranged so that no portion thereof extends to the standing or support surfaces.

In-feed apparatus 400 can be any suitable apparatus to perform an operation or operations on the containers, and can operate at any suitable speed. For example, in-feed apparatus 400 can operate so as to perform an operation or operations at eleven hundred containers per minute. In various embodiments, in-feed apparatus can ramp up to running speed to feed the containers, and can ramp down in speed upon cessation of operations.

Figure 2:
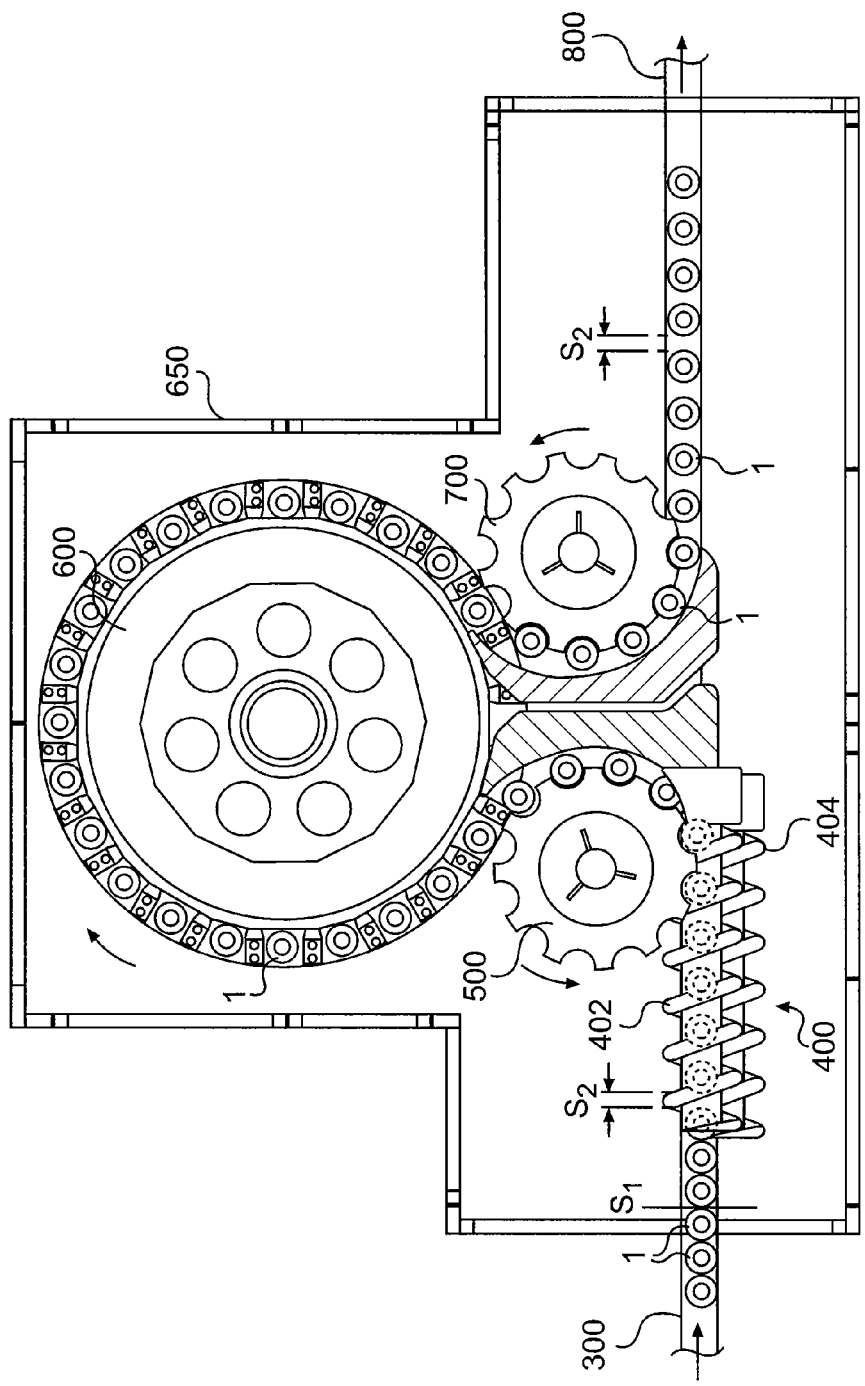
FIG. 2 is an overhead view representing a portion of a system and an apparatus according to various embodiments of the present invention.
Figure 3:
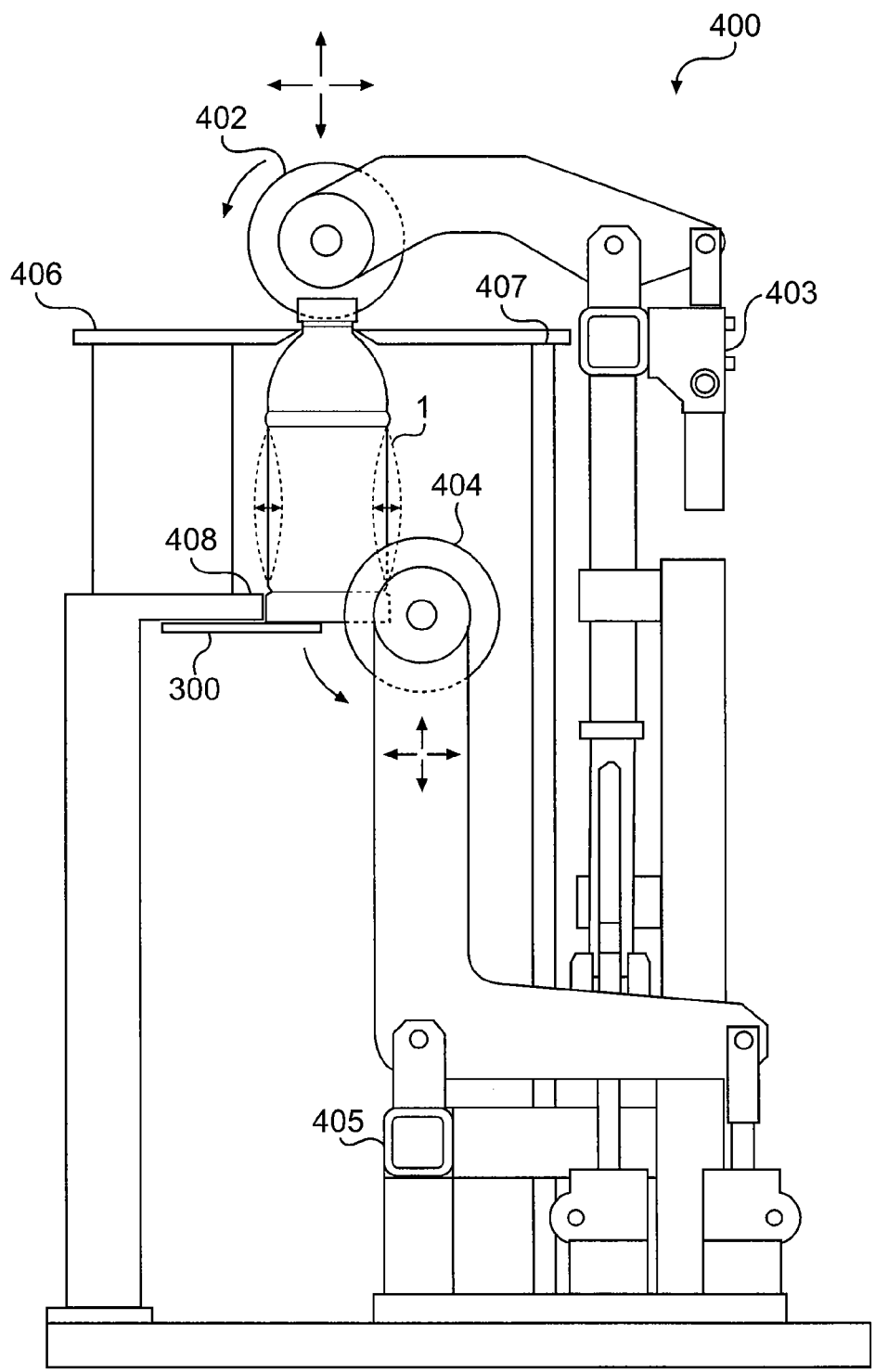
FIG. 3 is a rear view representation of a portion of a system and an apparatus according to various embodiments of the present invention.

As can be seen from FIG. 2, for example, the containers 1 can be fed to in-feed apparatus 400 single file. In various embodiments, the operation or operations of in-feed apparatus can include, but are not limited to, feeding the plurality of containers to rotary apparatus 500, providing support and stability to the containers for feeding to the rotary apparatus 500, and/or creating a distance (including a new, second distance) $S_2$ between adjacent ones of the containers for feeding to rotary apparatus 500.

Distance $S_2$ can be any suitable distance. In various embodiments, distance $S_2$ can be substantially uniform and may be based on either an outer diameter of the containers or a central longitudinal axis of the containers. Additionally, the distance $S_2$ may be based on a distance for feeding the container to an apparatus, such as rotary apparatus 500. Distance $S_2$ also may be based on a distance for reliably feeding the containers to an apparatus, such as rotary apparatus 500.

In-feed apparatus 400 can provide two positive control or touch points for each of the containers. In various embodiments, one of the positive control points may be at a top portion of the containers, and the other of the positive control points may be at a side portion of the containers. As can be seen from in FIG. 3, one of the positive control points may be located substantially above the containers, at a central longitudinal axis of the containers, and the other positive control point may be at a side portion of the container 1.

According to various embodiments, in-feed apparatus 400 can include a first conveying means 402 for conveying a plurality of containers; a second conveying means for conveying the plurality of containers 404; a third conveying means for conveying the plurality of containers 300; a first supporting means for supporting the plurality of containers 406; a second supporting means for supporting the plurality of containers 407; and a third supporting means for supporting the plurality of containers 408.

First conveying means 402 and second conveying means 404 can be any suitable means for conveying the containers. As shown in FIGS. 2 and 3, for example, first conveying means 402 and second conveying means 404 can be feed screws (hereinafter first feed screw 402 and second feed screw 404, respectively). Feed screws 402, 404 can be caused to rotate by any suitable means, including, but not limited to, a motor. Moreover, first feed screw 402 and second feed screw 404 can be arranged to act on any suitable position of the containers to move or convey the containers. In various embodiments, first feed screw 402 can be positioned substantially directly above the containers, so as to act on the containers at an upper end portion. The upper end portion may be at a cap or lid of the container, for example. Second feed screw 404 can be positioned to act on a sidewall of the container. For example, second feed screw can be positioned to act on a sidewall portion of a base portion. First feed screw 402 and second feed screw 404 may be configured to act on the containers at the same time.

First feed screw 402 may rotate in any suitable direction based on the configuration and orientation of the threads of the screw to act on the containers so as to move or convey the containers toward rotary apparatus 500. For example, FIG. 3 shows first feed screw 402 rotating counterclockwise. The portion of the container at which first feed screw 402 acts may be called a positive control point. Additionally, first feed screw 402 may rotate substantially synchronously with second feed screw 404 to act on the containers so as to move or convey the containers toward rotary apparatus 500.

First feed screw 402 can be of any suitable configuration (e.g., diameter, configuration of threads, such as pitch, spacing, thickness of threads, etc.). In various embodiments, the first feed screw 402 may be configured based on the configuration and size of the containers, and/or based on the configuration and size of the apparatus to which it feeds the containers. Moreover, the first feed screw 402 may be configured based on a desired distance to be created between adjacent containers. In various embodiments, the first feed screw 402 may be replaceable for another first feed screw, based on the configuration and size of the containers, and/or based on a desired distance to be created between adjacent containers.

First feed screw 402 may be moveable in any suitable direction. In various embodiments, first feed screw 402 may be moveable by an apparatus 403. Apparatus 403 can be any suitable apparatus to move first feed screw 402, such as, but not limited to, an actuator mechanism. In various embodiments, apparatus 403 can be configured to move first feed screw 402 upward, downward, inward, outward (as shown by the arrows above the first feed screw 402), or in a rotational direction parallel to a direction of conveyance. In various embodiments, apparatus 403 may move the first feed screw based on the size and configuration of the containers. For example, apparatus 403 may move first feed screw 402 upward or downward based on a height of the containers. Apparatus 403 also may be configured to move first feed screw 402 based on a malfunction of the system or apparatus, such as a jam.

As discussed above for the second conveying means 404, second feed screw may be arranged to act on any suitable position of the containers. In various embodiments, the second feed screw 404 may be configured so as to act on a sidewall of the container 7. For example, the second feed screw 404 may act on a portion of sidewall 7 that does not substantially deform (e.g., sidewall of base portion 2), or is not substantially pliable or flimsy. That is to say, in various embodiments, second feed screw 404 may be positioned to act against a portion of the sidewall of the container that is below or above the portion of the sidewall that may be substantially deformed, pliable, and/or flimsy 8. The deformed/pliable/flimsy portion may not maintain its shape when a force, such as a positive control force, is applied. Second feed screw 404 also may be positioned to act on a portion of the sidewall that is "stiffer" or less pliable than the deformed/pliable/flimsy portion of the sidewall. For example, a center of the second feed screw 404 may be positioned at ¼" above the container support or standing surface 9. Second feed screw 404 also may be positioned to act on the container based on a center of gravity of the container.

Second feed screw 404 may rotate, based on the configuration of the threads of the screw in any suitable direction to act on the containers so as to move or convey the containers toward rotary apparatus 500. In various embodiments, second feed screw 404 can rotate in the same direction, or in an opposite direction, as does first feed screw 402. Additionally, second feed screw 404 may rotate substantially synchronously with first feed screw 402 to act on the containers so as to move or convey the containers toward rotary apparatus 500. The portion of the container at which second feed screw 404 acts may be called a positive control point.

Second feed screw 404 can be any of any suitable configuration (e.g., diameter, configuration of threads, such as pitch, spacing, thickness of threads, etc.). In various embodiments, the second feed screw 404 may be configured based on the configuration and size of the containers, or based on the configuration and size of the apparatus to which it feeds the containers. Moreover, the second feed screw 404 may be configured based on a desired distance to be created between adjacent containers. In various embodiments, second feed screw 404 can be configured to work in conjunction with first feed screw 402 to create a desired distance or space $S_2$ between adjacent containers.

Second feed screw 404 may be replaceable for another second feed screw based on the configuration and size of the containers, or on a desired distance to be created between adjacent containers. Second feed screw 404 also may be moveable in any suitable direction. In various embodiments, second feed screw 404 may be moveable by an apparatus 405, which may be configured to move second feed screw 404 upward, downward, inward, outward (as shown by the arrows below the second feed screw 404), or in a rotational direction parallel to a direction of conveyance. Apparatus 405 can be any suitable apparatus to move second feed screw 404, such as, but not limited to, an actuator mechanism. In various embodiments, apparatus 405 may move the second feed screw 404 based on the size and configuration of the containers. For example, apparatus 405 may move second feed screw 404 upward or downward based on a height of the containers, a center of gravity of the containers, a deformed portion of the containers, etc. The apparatus 405 may also be configured to move second feed screw 404 based on a malfunction of the system or apparatus, such as a jam.

In various embodiments, the third conveying means may be represented by a portion of conveyor apparatus 300 that assists in conveying the containers at the same time as the first and second conveying means 402, 404. As can be seen by the rightward-going arrow in FIG. 2, the first conveying means 402 and the second conveying means 404 can convey the containers in the same direction as indicated by the arrow.

First supporting means 406 can be any suitable means for supporting the containers. In various embodiments, first supporting means 406 can be a stationary guide that supports the containers as they are conveyed by the first conveying means 402 (e.g., first feed screw), the second conveying means 404 (e.g., second feed screw), and the conveyor apparatus 300. First supporting means 406 can be configured to prevent movement by the containers in a direction perpendicular to the direction in which the containers are being conveyed. For example, as shown in FIG. 3, first supporting means 406 may reduce or prevent the containers from moving outward (leftward in FIG. 3). In various embodiments, first supporting means 406 may reduce or prevent an upper or top portion of the container, such as, but not limited to a neck portion, from moving perpendicular to the direction in which the containers are being conveyed.

Second supporting means 407 can be any suitable means configured to support the containers. In various embodiments, second supporting means 407 can be a stationary guide that supports the containers as they are conveyed by the first conveying means 402 (e.g., first feed screw), the second conveying means 404 (e.g., first feed screw), and the conveyor apparatus 300. Second supporting means 407 can be configured to reduce or prevent movement by the containers in a direction perpendicular to the direction in which the containers are being conveyed. For example, as shown in FIG. 3, second supporting means 407 may reduce or prevent the containers from moving inward (rightward in FIG. 3). Second supporting means 407 may reduce or prevent movement by an upper or top portion of the container from moving perpendicular to the direction in which the containers are being conveyed. In various embodiments, second supporting means may be a stationary guide 407, as shown in FIG. 3. Stationary guide 407 can be configured to support the containers at any suitable position. In various embodiments, stationary guide 407 can be configured to support the containers at a neck portion of the containers. Moreover, second supporting means 407 may be configured to support the containers at a position opposite to the first supporting means 406.

Third supporting means 408 can be any suitable means configured to support the containers. In various embodiments, third supporting means 408 can be a stationary guide that supports the containers as they are conveyed by the first conveying means 402, the second conveying means 404, and the conveyor apparatus 300. Third supporting means 408 can be configured to reduce or prevent movement by the containers in a direction perpendicular to the direction in which the containers are being conveyed. In various embodiments, third supporting means 408 may reduce or prevent movement a lower or base portion of the container from moving perpendicular to the direction in which the containers are being conveyed. For example, as shown in FIG. 3, third supporting means 408 may reduce or prevent the containers from moving outward (leftward in FIG. 3). In various embodiments, third supporting means may be a stationary support 408 that is configured to support the containers at any suitable position on the container. Stationary support 408 can be positioned substantially opposite to, or on the other side of the container, with respect to a position at which second conveying means 404 acts on the containers.

Apparatus 500 can be any suitable apparatus configured to perform an operation or operations on the containers. In various embodiments, apparatus 500 can be a rotary apparatus, and the operation to be performed on the containers can be to receive the containers from in-feed apparatus 400 and transfer or convey the containers to apparatus 600. Rotary apparatus 500 can be of any suitable shape and size, and can be configured to hold any suitable number of containers for transfer or conveyance from in-feed apparatus 400 to apparatus 600. Moreover, rotary apparatus 500 can rotate at any suitable rate, and may rotate opposite to the direction of rotation of apparatus 600. For example, as shown in FIG. 2, rotary apparatus 500 can rotate counterclockwise and apparatus 600 can rotate clockwise. In FIG. 2, rotary apparatus 500 is shown sequentially receiving the containers from in-feed apparatus 400 at a first position, conveying or transporting the containers in a generally counterclockwise direction to a position where they are sequentially fed to apparatus 600.

In various embodiments, rotary apparatus 500 may be configured as a star wheel with a plurality of pockets to receive respective ones of the containers for transfer or conveyance to apparatus 600. The configuration of the plurality of pockets (e.g., the spacing) can be determined based on the space or distance created between the containers by in-feed apparatus 400. Alternatively, the space or distance to be created between adjacent containers by in-feed apparatus 400 may be based on the configuration of the pockets of rotary apparatus 500. For example, the in-feed apparatus 400 may be configured to create a space or distance between adjacent containers such that the containers can substantially reliably be transferred to the pockets of rotary apparatus 500. Additionally, the shape and/or size of the plurality of pockets can be based on the shape and/or size of the containers to be received.

Apparatus 600 can be any suitable apparatus configured to perform an operation or operations on the containers. In various embodiments, apparatus 600 can be a rotary apparatus, and the operation to be performed on the containers can be to receive the containers from rotary apparatus 500, to transfer or convey the containers to apparatus 700, and/or to activate or move vacuum panels of the containers. In various embodiments, the vacuum panels can be moved or activated sequentially, by any suitable apparatus, as they are rotated around the rotary apparatus 600.

Rotary apparatus 600 can be of any suitable shape and size, and can be configured to hold any suitable number of containers for transfer or conveyance from rotary apparatus 500 to apparatus 700. Moreover, rotary apparatus 600 can rotate at any suitable rate (e.g., for a speed of 1100 bottles per minute), and may rotate opposite to the direction of rotation of rotary apparatuses 500 and 700. For example, as shown in FIG. 2, rotary apparatuses 500 and 700 can rotate counterclockwise and apparatus 600 can rotate clockwise.

In various embodiments, rotary apparatus 600 can be a turret having a plurality of heads (not explicitly shown). Once the bottle is on a turret platen, a top hold down can be stroked down on top of the bottle. The vacuum panel of the container may then be moved, inverted, or activated, thereby doing one of reducing a vacuum created in the filled and sealed container, creating a "zero" pressure inside the filled and sealed container, or creating an overpressure in the filled and sealed container. Inverting or activating the vacuum panel also may cause a deformed, flimsy, or pliable sidewall portion to be transformed. In various embodiments, the deformed, flimsy, or pliable portion may be transformed so as to take a form substantially the same as blow molded, to take a form substantially as before being filled with a product, to take a form that is substantially smooth, and/or to take a form that is rounded. The vacuum panel can be moved, inverted, or activated by any suitable means 14 (shown diagrammatically in FIG. 5), such as, but not limited to, a single rod or an actuator that conforms to at least a portion of the shape of the vacuum panel or end portion of the base portion of the container.

Each head on the turret may include three units (not shown). An upper unit may be moved up and down by a cam which positions a top hold down tool over the top of the closure to hold the container down when the vacuum panel is moved, inverted, or activated. A bottom unit, which may be an activator cone assembly, can be activated by a cam to stroke the cone up and down. A middle unit can support the container on a platen and locate the container in a nest.

Rotary apparatus 700 can be any suitable apparatus configured to perform an operation or operations on the containers. In various embodiments, the operation may be to receive the containers from rotary apparatus 600 and to convey or transfer the containers to apparatus 800. Rotary apparatus 700 can be of any suitable shape and size, and can be configured to hold any suitable number of containers for transfer or conveyance from rotary apparatus 600 to apparatus 800. In various embodiments, rotary apparatus 700 can be configured substantially the same as rotary apparatus 500. For example, rotary apparatus 700 my be configured to hold or transport the same number of containers as rotary apparatus 500.

Rotary apparatus 700 can rotate at any suitable rate, and may rotate opposite to the direction of rotation of apparatus 600. For example, as shown in FIG. 2, rotary apparatus 700 can rotate counterclockwise and apparatus 600 can rotate clockwise. In FIG. 2, rotary apparatus 700 is shown sequentially receiving the containers from rotary apparatus 600 at a first position, conveying or transporting the containers in a generally counterclockwise direction to a position where they are sequentially fed to apparatus 800.

In various embodiments, rotary apparatus 700 may be configured as a star wheel with a plurality of pockets to receive respective ones of the containers for transfer or conveyance to apparatus 800. The configuration of the plurality of pockets (e.g., the spacing) can be determined based on the space or distance created between the containers by in-feed apparatus 400. The shape and/or size of the plurality of pockets can be based on the shape and/or size of the containers to be received and conveyed or transported.

Apparatus 800 can be any suitable apparatus configured to perform an operation or operations on the containers. In various embodiments, apparatus 800 may be a conveyor apparatus 800, such as, but not limited to a conveyor belt, which can be any suitable apparatus to convey a plurality of containers after operations by apparatuses 400, 500, 600, and 700. Moreover, conveyor apparatus 800 may be an extension of conveyor apparatus 300. That is to say, conveyor apparatus 300 may be continuous and provide the operations performed at an "out-feed" side as well as at an "in-feed" side for rotary apparatus 600. In various embodiments, conveyor apparatus 300 can receive the containers from rotary apparatus 700 and can convey the containers single file. In various embodiments, the containers can be conveyed at a distance $S_2$ created by in-feed apparatus 400 and maintained by apparatuses 500, 600, and 700. Furthermore, conveyor apparatus 800 can convey the containers at any suitable speed, including, but not limited to, at about eleven hundred containers per minute.

Similar to conveyor apparatus 300, conveyor apparatus 800 can convey the containers by a standing or support surface 9 of the container 1. Additionally, containers to be conveyed by conveyor apparatus 800, according to various embodiments of the invention, each may be have had their respective vacuum panels activated.

Apparatus 900 can be any suitable apparatus configured to perform an operation or operations on the containers. In various embodiments, the operation may be to perform an inspection on the containers. For example, apparatus 900 can be configured to inspect a fill height of the containers after their respective vacuum panels have been moved, inverted, or activated. In various embodiments, apparatus 900 can also include a rejection system to reject and discard containers determined to have failed any suitable inspection.

Figure 4:
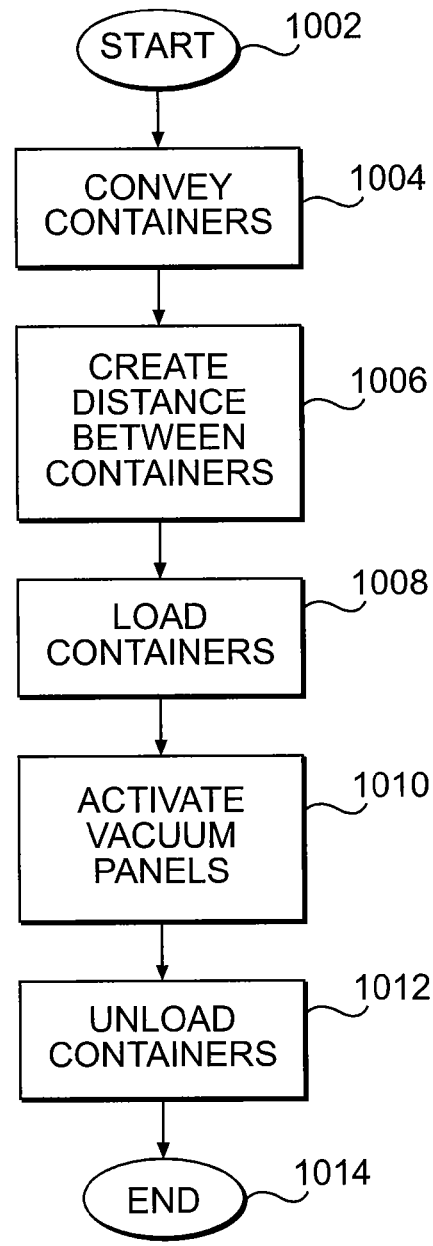
FIG. 4 is a flow chart representation of a method according to various embodiments of the present invention.

A method 1000 according to various embodiments of the present invention will now be described with respect to FIG. 4.

The method can start at 1002 and may move to step 1004. At step 1004, any suitable operation or operations can be performed on the containers. In various embodiments, the containers can be conveyed by, for example, conveyor apparatus 300.

The containers being conveyed can be of any suitable configuration, as described above. The containers can be either sealed or unsealed. For example, the containers being conveyed can be filled and sealed with a product, substantially as described above. Additionally, the filled and sealed containers may have a vacuum created therein.

Containers being conveyed also may have at least one portion that is deformable, flimsy, and/or pliable. In various embodiments, the containers can have at least a sidewall portion and/or a base portion that is/are deformable, flimsy, and/or pliable. For example, a vacuum panel can be provided in a bottom end portion of the base portion of each of the containers. The vacuum panel may be unactivated and no portion of the vacuum panel may extend below the standing or support portion of the container. Furthermore, containers formed or configured with the deformable, flimsy, and/or pliable portion, such as a vacuum panel, formed in a bottom end portion thereof can be conveyed with the deformable, flimsy, and/or pliable portion at the bottom end thereof in any suitable position, arrangement, or status. For example, containers having a vacuum panel at the bottom end can be conveyed with the vacuum panel either activated or un-activated. Note that deformable sidewall portion can include a vacuum panel or panels and/or any other portion that is or can be caused to deform. Alternatively, in various embodiments, containers being conveyed according to various embodiments of the present invention may not be configured or formed with a deformable, flimsy, and/or pliable portion or portions at a bottom end portion thereof, or any portion thereof.

At step 1004, the containers can be conveyed in any suitable configuration (e.g., arrangement). For example, the containers can be conveyed single file. At step 1004, the containers can be conveyed to any suitable apparatus, for any suitable purpose. In various embodiments, the containers can be conveyed to in-feed apparatus 400.

At step 1006, a distance or spacing can be created between adjacent ones of containers. In various embodiments, the distance or spacing can be substantially uniform and can be created based on any suitable means or reason, including, but not limited to, a configuration of a rotary apparatus, such as rotary apparatus 500, to which the containers are to be fed, transferred, or loaded. The distance or spacing can be created by providing two positive control points. In various embodiments, the positive control points can create the distance or spacing between adjacent containers and convey the containers in a first direction. The positive control points can be positioned substantially as described above, and can be provided by, for example, first feed screw 402 and second feed screw 404, respectively.

At step 1008, the containers can be fed or loaded to any suitable apparatus. In various embodiments, in-feed apparatus 400 can feed or load the containers, sequentially, to a rotary apparatus. The rotary apparatus may be rotary apparatus 500 or rotary apparatus 600, for example. The containers also can be fed or loaded at the space or distance created in step 1006.

After step 1008, the containers can be loaded or fed to another rotary apparatus, such as rotary apparatus 600. At step 1010, vacuum panels in the containers can be activated or moved. The vacuum panels can be located at any suitable location on the container, including, but not limited to, at a bottom end portion of a base portion of the containers. In various embodiments, the vacuum panels can be activated or moved to modify an internal pressure of the container. For example, the vacuum panels can be moved or activated to either reduce a vacuum in the container, create a zero pressure in the container, or create an overpressure in the container. In various embodiments, the activation or movement may include forcing at least a portion of the vacuum panel upward and inward, toward the inner volume of the filled and sealed container. The activation or movement of the vacuum panel can be caused by any suitable means including, but not limited to, a single rod or an actuator that conforms to at least a portion of the shape of the vacuum panel or end portion of the base portion of the container.

The activation or moving of the vacuum panel also may modify a shape of the container. In various embodiments, the activation or moving of the vacuum panel may cause a deformed, pliable, or flimsy portion of the container to be transformed. For example, a container having a sidewall portion 8 that is deformed as shown by the dashed lines 8b show in FIG. 5 may be transformed to take a shape substantially as represented by line 8. The sidewall shape represented by line 8 may represent a sidewall shape and/or configuration substantially as blow molded or a shape prior to the container being filled.

At step 1012, the containers can be unloaded or fed to another apparatus. In various embodiments, the containers can be unloaded or fed to another apparatus after their respective vacuum panels have been moved or activated. Moreover, the containers can be unloaded or fed to any suitable apparatus. For example, the containers can be unloaded or fed from rotary apparatus 600 to rotary apparatus 700. After being unloaded or fed, the containers can be subjected to any suitable operation or operations by any suitable apparatus. Though not explicitly shown in FIG. 4, after being unloaded from rotary apparatus 600 to rotary apparatus 700, the containers can be sequentially unloaded to conveyor apparatus 800, for example, which can convey the containers to another apparatus, such as an inspection and/or discarding apparatus.

At step 1014, the method can end after any suitable number of operations have been performed on the containers.

The system, apparatus, and method according to various embodiments can be controlled and/or operated by any suitable means. For example the system, apparatus, and method can be controlled and/or operated by a computerized controlling means, such as a computer system. The computerized controlling means may allow for all or partial automation of the system, apparatus, and method according to various embodiments of the invention. One or more human operators or controllers may also assist in controlling and/or operating the system, apparatus, and method according to various embodiments of the present invention.

While the present invention has been described in conjunction with a number of embodiments, the invention is not to be limited to the description of the embodiments contained herein, but rather is defined by the claims appended hereto and their equivalents. It is further evident that many alternatives, modifications, and variations would be or are apparent to those of ordinary skill in the applicable arts. Accordingly, all such alternatives, modifications, equivalents, and variations that are within the spirit and scope of this invention.

What is claimed is:

1. A method for conveying a plurality of filled and sealed plastic containers, each of the filled and sealed plastic containers including a deformable side portion and a bottom portion having a standing portion and a vacuum panel, the method comprising:
   conveying, by a conveyor apparatus, the plurality of filled and sealed plastic containers single file, each of the filled and sealed plastic containers having respective side portions that are deformed and vacuum panels that are un-activated and arranged so as not to extend below the standing portion, wherein a first side portion of the standing portion of each of the filled and sealed plastic containers rests on a portion of the conveyor apparatus;
   creating a substantially uniform distance between adjacent ones of the filled and sealed plastic containers having respective deformed side portions and vacuum panels that are un-activated and arranged so as not to extend below the standing surface, said creating a substantially uniform distance including providing two positive control points for each of the filled and sealed plastic containers; and
   after said creating a substantially uniform distance, sequentially feeding the plurality of filled and sealed plastic containers,
   wherein the substantially uniform distance is based on said sequentially feeding,
   wherein one of the positive control points is at a top portion of the filled and sealed plastic container,
   wherein the other of the positive control points is at the bottom portion of the filled and sealed plastic container,
   wherein the one positive control point is at a central longitudinal axis of the filled and sealed plastic container, and
   wherein the other positive control point is at a second side portion of the bottom portion.

2. The method of claim 1, wherein the substantially uniform distance is further based on a central longitudinal axis of the plurality of filled and sealed plastic containers.

3. The method of claim 1,
   wherein each of the plurality of filled and sealed plastic containers has a vacuum created therein, and
   the method further comprises, after said sequentially feeding, sequentially activating vacuum panels of the plurality of filled and sealed plastic containers to modify associated vacuums.

4. The method of claim 3, wherein each activation of said sequentially activating vacuum panels includes forcing at least a portion of the vacuum panel upward and inward, toward the inner volume of the filled and sealed plastic container.

5. The method of claim 3, wherein the modifying associated vacuums includes one of reducing a portion of the vacuum, reducing the entirety of the vacuum, and creating an overpressure in the filled and sealed plastic container.

6. The method of claim 3, wherein each activation of said sequentially activating vacuum panels transforms the deformed side portion of the sealed and filled plastic container.

7. The method of claim 6, wherein the deformed side portion is transformed to a form, substantially as blow molded.

8. The method of claim 1, wherein the one positive control point is at a first substantially non-deformable portion of the container and the other positive control point is at a second substantially non-deformable portion of the container, the first and second substantially non-deformable portions being at apposite ends of the container.

9. The method of claim 1, wherein said conveying includes supporting the first side portion of the standing portion of each of the filled and sealed containers by resting directly on a horizontal support.

10. A system for conveying a plurality of filled and sealed plastic containers, each of the filled and sealed containers including a sidewall having a substantially deformable portion and a bottom portion having a standing portion, the system comprising:
    a conveyor apparatus to convey the plurality of filled and sealed containers, wherein a first side portion of the standing portion of each of the filled and sealed plastic containers rests on a portion of the conveyor apparatus;
    an in-feed apparatus, which includes a first feed screw and a second feed screw, and which receives the filled and sealed containers from said conveyor apparatus; and
    a rotary apparatus to receive the plurality of filled and sealed containers after said in-feed apparatus,
    wherein said in-feed apparatus is configured to create space between adjacent ones of the filled and sealed containers having respective substantially deformable portions in a deformed state, with said first feed screw and said second feed screw acting on the plurality of filled and sealed containers to create the respective spaces,
    wherein the space created between adjacent ones of the filled and sealed containers is for receipt by said rotary apparatus,
    wherein said first feed screw is configured to be positioned substantially directly above the plurality of filled and sealed containers, and
    wherein said second feed screw is positioned so as to act on a second side portion of the bottom portion of each of the plurality of sealed and filled containers the second side portion of the bottom portion being not substantially deformable.

11. The system of claim 10, wherein said in-feed apparatus further includes:
    a first stationary guide to support the plurality of filled and sealed containers;
    a second stationary guide to support the plurality of filled and sealed containers; and
    a third stationary guide to support the plurality of filled and sealed containers, said third stationary guide being positioned at a portion of the sidewall substantially opposite to the second side portion of the bottom portion at which said second feed screw is positioned.

12. The system of claim 10,
    wherein said first feed screw and said second feed screw are configured to act on the plurality of filled and sealed containers at the same time.

13. The system of claim 10, wherein said in-feed apparatus further includes an in-feed wheel to receive the filled and sealed containers from said first and second feed screws and to feed the filled and sealed containers to said rotary apparatus.

14. The system of claim 10, further comprising an in-feed wheel,
    wherein said in-feed apparatus is configured to feed the plurality of filled and sealed containers having spaces therebetween to said in-feed wheel, and
    wherein said in-feed wheel is configured to feed the filled and sealed containers having spaces therebetween to said rotary apparatus.

15. The system of claim 10,
    wherein said rotary apparatus includes an actuator apparatus to move a vacuum panel positioned in the bottom portion of each the filled and sealed containers from a first position to a second position, and wherein the first position of the vacuum panel is at or entirely above the standing portion of the filled and sealed container, and the second position of the vacuum panel is above the first position.

16. The system of claim 15, further comprising an out-feed wheel, wherein the out-feed wheel is configured to receive the plurality of filled and sealed containers having vacuum panels in the second position.

17. The system of claim 10, further comprising the plurality of filled and sealed plastic containers, each of the filled and sealed plastic containers including a sidewall having a substantially deformable portion and the bottom portion having a vacuum panel.

18. The system of claim 10, wherein said first feed screw has a uniform pitch and said second feed screw has a uniform pitch.

19. An apparatus comprising:
first conveying means for conveying a plurality of filled and sealed plastic containers in a first direction, each of the filled and sealed plastic containers having a deformable portion in a deformed state and a bottom portion having a standing portion;
second conveying means for conveying the plurality of filled and sealed plastic containers in the first direction; and
third conveying means for conveying the plurality of filled and sealed plastic containers in the first direction,
wherein said first conveying means for conveying is configured to move so as to act against a first portion of each of the plurality of filled and sealed plastic containers to convey the plurality of filled and sealed plastic containers in the first direction,
wherein said second conveying means for conveying is configured to move so as to act against a second portion of each of the plurality of filled and sealed plastic containers to convey the plurality of filled and sealed plastic containers in the first direction,
wherein said third conveying means for conveying is configured to convey the plurality of filled and sealed plastic containers in the first direction by a third portion of the standing portion of each of the plurality of filled and sealed plastic containers,
wherein the first, second, and third conveying means are configured to convey the plurality of filled and sealed plastic containers at the same time, and
wherein the first, second, and third portions of each of the plurality of filled and sealed plastic containers are different from each of the respective other portions, with the first portion being at a position on each of the plurality of filled and sealed plastic containers higher than the second portion and aligned with a central longitudinal axis of each of the plurality of filled and sealed plastic containers, with the second portion being at a second side portion of the bottom portion of each of the plurality of filled and sealed plastic containers, and with the third portion being a first side portion of the standing portion of each of the plurality of filled and sealed plastic containers.

20. The apparatus of claim 19, further comprising:
first supporting means for supporting the plurality of filled and sealed plastic containers;
second supporting means for supporting the plurality of filled and sealed plastic containers; and
third supporting means for supporting the plurality of filled and sealed plastic containers, said third supporting means for supporting being configured to be positioned at a portion of the plurality of filled and sealed plastic containers opposite to the second portion,
wherein each of the plurality of filled and sealed plastic containers includes a deformable side portion and the bottom portion has a vacuum panel,
wherein said first, second, and third conveying means for conveying are configured to convey the plurality of filled and sealed plastic containers simultaneously, and
wherein the first, second, and third conveying means for conveying are configured to convey the plurality of filled and sealed plastic containers with vacuum panels being un-activated and positioned entirely above the standing portion.

21. The apparatus of claim 19, wherein said first conveying means for conveying and said second conveying means for conveying further are for spacing ones of the plurality of filled and sealed plastic containers from adjacent ones of the plurality of filled and sealed plastic containers.

22. The apparatus of claim 21, further comprising:
fourth conveying means for conveying the plurality of filled and sealed plastic containers having been spaced in a second direction, different from the first direction, said fourth conveying means for conveying being configured based on the spacing of the filled and sealed plastic containers; and
activating means for activating a vacuum panel in each of the plurality of filled and sealed plastic containers.

23. The apparatus of claim 19,
wherein the first portion is at an upper end portion of the plurality of filled and sealed plastic containers.

24. The apparatus of claim 19, wherein said first conveying means includes a first feed screw having a uniform pitch and said second conveying means includes a second feed screw having a uniform pitch.

* * * * *